United States Patent [19]

Swanberg

[11] Patent Number: 5,164,843
[45] Date of Patent: Nov. 17, 1992

[54] SCANNER WITH A LINEARIZED VCO PIXEL CLOCK

[75] Inventor: Melvin E. Swanberg, Claremont, Calif.

[73] Assignee: Olive Tree Technology, Inc., Monrovia, Calif.

[21] Appl. No.: 539,577

[22] Filed: Jun. 18, 1990

[51] Int. Cl.⁵ .............................................. H04N 1/16
[52] U.S. Cl. .................................... 358/474; 358/480; 358/481
[58] Field of Search ....................... 358/480, 481, 474; 307/261, 268; 331/17

[56] References Cited

U.S. PATENT DOCUMENTS

| 4,342,050 | 7/1982 | Traino | 358/406 |
| 4,400,740 | 7/1983 | Traino et al. | 358/481 |
| 4,694,156 | 9/1987 | Swanberg | 250/214 |
| 4,706,251 | 7/1988 | Shimda et al. | 358/481 |
| 4,729,617 | 3/1988 | Shimda et al. | 358/208 |
| 4,849,652 | 7/1989 | Hulshof | 307/268 |
| 4,920,430 | 4/1990 | Isono et al. | 358/481 |
| 4,977,334 | 12/1990 | Handler | 307/261 |

Primary Examiner—Edward L. Coles, Sr.
Assistant Examiner—Thomas L. Stoll
Attorney, Agent, or Firm—Matthew F. Jodziewicz

[57] ABSTRACT

A scanner system includes a light source for producing a light beam and scanning components for directing the light beam to a spot on a surface to be scanned that is located at a predetermined location relative to the scanning means, moving the spot across the surface along a scan line of predetermined length in a series of scan cycles. The system includes a pixel clock that produces a train of clock pulses during each of the scan cycles using a VCO circuit for producing the train of clock pulses and a control circuit for varying the timing of the clock pulses. The control circuit includes an waveshaping circuit for causing the control signal to have a waveform such that the timing of the clock pulses varies according to the position of the spot along the scan line in order to compensate for scanner non-linearity in a manner reducing pixel position distortion. One embodiment includes a digital to analog converter circuit, an absolute value circuit, and a multiple-slope amplifier circuit that shape the control signal waveform to a straight line fit of a desired curve, and the pixel clock circuitry is configured to produce exposure control pulses that reduce pixel exposure distortion.

17 Claims, 7 Drawing Sheets

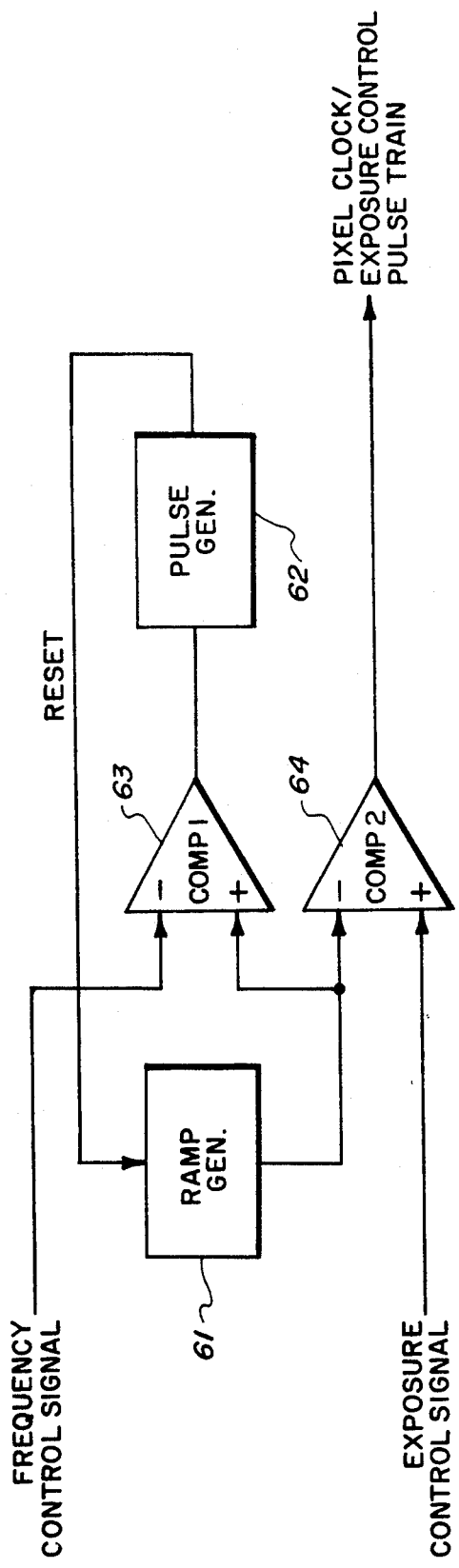
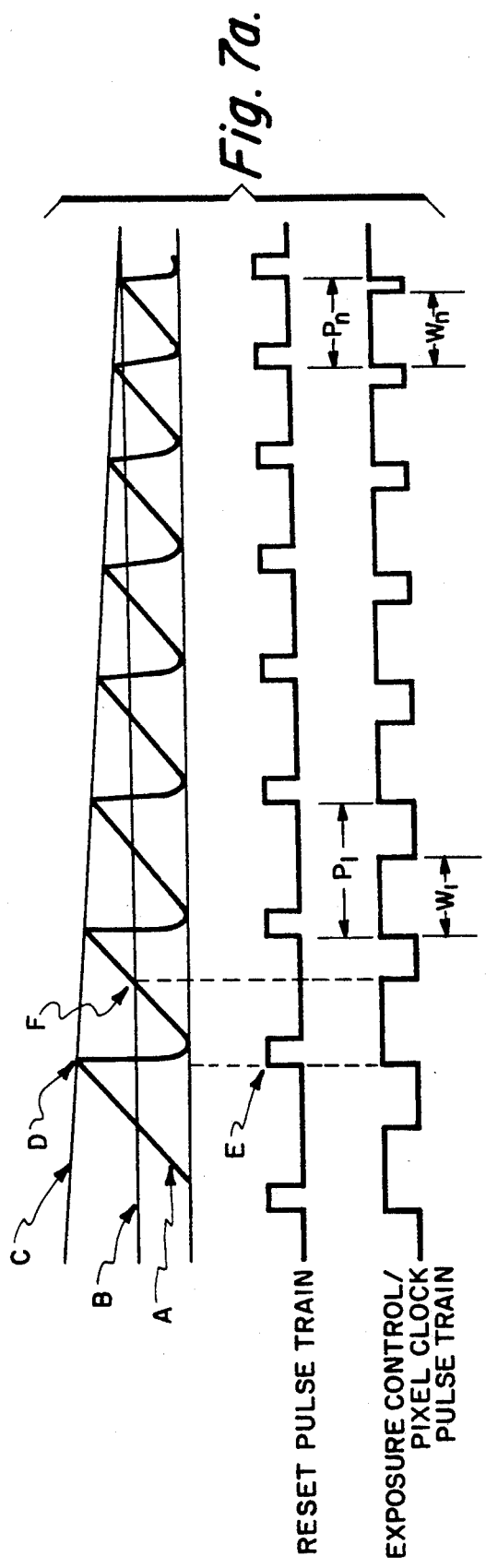

SCANNER WITH A LINEARIZED VCO PIXEL CLOCK

BACKGROUND OF THE INVENTION

1. Technical Field

This invention relates generally to input and output scanners, and more particularly to a scanner with a linearized pixel clock that compensates for scanner non-linearity.

2. Background Information

A scanner includes some type of scanning means for directing a light beam to a spot on a surface to be scanned. It does so in such a way that the spot moves across the surface along a scan line in a precisely controlled manner. That enables various input and output functions such as reading a document or printing a page.

Scanner non-linearity refers to variations in spot velocity occurring as the spot moves along the scan line. It is typically caused in such systems as polygon or galvanometer laser scanner systems by system geometry or a velocity variation of the scanning means and it can affect scanner performance. A scanner having a multifaceted rotating polygon, for example, directs the light beam at a constant angular velocity. But the spot is farther from the polygon facets at the ends of the scan line than it is at the center and so spot velocity increases as the spot moves from the center toward the ends. That can result in uneven pixel spacing along the scan line, a condition sometimes called pixel position distortion.

Some scanners compensate for scanner non-linearity electronically in order to reduce pixel position distortion using a linearized pixel clock. The pixel clock produces a pulse train that is used to turn the light beam on and off at each desired pixel position along the scan line, and it is said to be linearized in the sense that timing circuitry varies pulse timing according to spot position along the scan line and thereby according to spot velocity. That is done to at least partially compensate for scanner non-linearity in order to reduce pixel position distortion and produce more evenly spaced pixels.

Consider, for example, a scanner having a nine-inch scan line and a resolution of 300 dots-per-inch (dpi). That means there are 2700 pixel positions along the scan line. Ideally, the center-to-center spacing between any two adjacent pixel positions would be 1/300 inch so that they are evenly spaced. To accomplish that, each pulse in the pulse train must occur at just the right time to compensate for varying spot velocity. In other words, the time interval between each pulse and the following pulse must bear some defined relationship to spot position along the scan line and thereby spot velocity.

But it is difficult to produce such a pulse train. U.S. Pat. No. 4,729,617, for example, describes a scanning clock generating device having a voltage controlled oscillator (VCO). Timing circuitry varies its frequency according to spot velocity using variable frequency division of a fixed oscillator to produce reference pulses that control the VCO. Somewhat complicated logic and frequency dependent componentry are involved, however. So it is desirable to have some other way of providing a linearized pixel clock.

Another problem concerns the variations in pixel exposure resulting from the variations in spot velocity. Sometimes referred to as pixel exposure distortion, it can result in objectionable variations in shade despite compensation for scanner non-linearity that reduces pixel position distortion. Although it is conceivable to vary the intensity of the light beam according to spot position along the scan line offset that effect, accurate intensity control may be difficult and expensive to achieve. Thus, it is desirable to have some other way to reduce unwanted variations in shade of the type described.

Still another problem concerns the variation in pixel "blur," the result of pixel motion during the exposure, which causes the size of the pixel exposure to be increased somewhat over the size of the scanning spot. In other words, the spot is moving along the scan line during exposure. In a typical scanner, the spot size is designed to be somewhat smaller than the pixel size in the scan direction such that with the addition of exposure blur the pixel exposure will be the correct size. The effect of spot blur is that the resolution capabilities of the scanner are somewhat less than the resolution capabilities of the optical system. Also, with a constant exposure time for each pixel, the variation of spot velocity will cause a variation in the degree of spot blur, thus affecting the size of the pixel exposure. In scanner systems that have a large variation in spot velocity, this variation of pixel exposure size may be significant. Thus, it is desirable to have some way to reduce or eliminate such pixel blur and to eliminate or reduce the variation of pixel exposure size.

SUMMARY OF THE INVENTION

This invention solves the problems outlined above by providing a scanner with a pixel clock that has a VCO for producing a train of clock pulses and waveshaping circuitry for producing a linearized VCO control signal. The waveform of the control signal is such that the frequency of the VCO varies in a way compensating for scanner non-linearity in order to reduce pixel position distortion. That results in less logic circuitry and less frequency dependent componentry.

Generally, a scanner system constructed according to the invention includes a light source for producing a light beam and scanning means for directing the light beam to a spot on a surface to be scanned that is located at a predetermined location relative to the scanning means. That is done so that the spot moves across the surface along a scan line of predetermined length in a series of scan cycles. In addition, the system includes a pixel clock for producing a train of clock pulses during each of the scan cycles as a timing signal for use in turning the light beam on and off at a predetermined number of pixel positions, the pixel clock circuit including a VCO circuit for producing the train of clock pulses and a control circuit for varying the frequency of the VCO circuit in order to thereby vary the timing of the clock pulses.

According to a major aspect of the invention, the control circuit includes a waveshaping circuit for causing the control signal to have a waveform such that the timing of the clock pulses varies according to the position of the spot along the scan line in a way compensating for scanner non-linearity in order to reduce pixel position distortion. For that purpose, one embodiment, in addition to the typical pixel counter and VCO phase locked loop, includes a digital to analog converter, an absolute value circuit, and a nonlinear amplifier circuit. The digital to analog circuit converts the pixel counter digital signal into an analog signal that corresponds to the instantaneous spot scan position relative to the start of scan position. The absolute amplifier converts this scan position signal into a signal that corresponds to the distance of the spot from the center of the scan (COS), this signal being coupled to the nonlinear amplifier circuit. The nonlinear amplifier circuit produces the control signal so that it has a waveform that would result in a desired variation in the timing of the clock pulses. Preferably, the VCO circuitry is configured to produce constant width clock pulses in order to compensate for scanner non-linearity in a manner reducing pixel exposure distortion.

In line with the above, a method of compensating for scanner non-linearity in order to reduce pixel position distortion includes the step of providing a pixel clock circuit that includes a VCO circuit in a phase locked loop for providing a train of clock pulses and a control circuit for controlling the VCO circuit in order to vary the timing of the clock pulses. The method proceeds by controlling the VCO so that the train of clock pulses have an average frequency that results in the desired number of pixels between the start of scan (SOS) and end of scan (EOS) signals, the SOS signal being generated electro-optically by the scanning spot, and the EOS signal being similarly generated, or by use of a reference oscillator and counter using techniques well known in the art.

The phase locked loop uses a pixel counter which is also used to provide spot position information in order to generate a VCO controlling waveform that is shaped to approximate the control signal that would result in a desired variation in the timing of the clock pulses in accordance with the instantaneous position of the scanning spot. The step of shaping the waveform may include a digital to analog conversion of the pixel counter output to produce a scan position signal, then shaping with an absolute amplifier to develop a scan COS distance signal representing the spot distance from the center of scan, and then shaping with a non-linear amplifier to shape the signal into a straight line approximation of the curve control signal (such as a multi-slope amplifier circuit).

Stated another way, a method of compensating for scanner non-linearity in order to reduce pixel position distortion includes the step of providing a pixel clock circuit that includes a VCO circuit for producing a train of clock pulses and a control circuit for controlling the VCO circuit in order to vary the timing of the clock pulses. The method proceeds by shaping the waveform of the control signal to approximate a curve representing the control signal waveform that would result in a desired variation in the timing of the clock pulses. The step of shaping the waveform may include producing a scan position signal, shaping the scan position signal into a scan COS distance signal, and then shaping the scan COS distance signal into a straight line approximation of the curve.

The method may also include the step of producing a train of constant width pulses in order to compensate for scanner non-linearity in a manner reducing pixel exposure distortion, i.e, producing a train of constant width pulses that can be used as the pixel clock as well as a constant exposure control, to reduce pixel blur or provide a constant pixel blur. In that regard, the pixel clock may be configured to produce constant exposure timing for each pixel position in order to turn a constant intensity light beam on for the same time interval for each pixel position and thereby produce uniform exposure from pixel to pixel. Further, the method may include the step of producing a train of exposure control pulses that can be varied (that in addition to reducing pixel exposure distortion allows for adjustment of the level of constant exposure) or varied pixel by pixel for creating gray scale images, or displace pixel exposure relative to the pixel period to give the effect of having an increased resolution.

Further, in order to reduce pixel blur and to realize the maximum resolution from the optical system, a short exposure time at high intensity can achieve the same exposure but with very little exposure blur. Alternatively, where high intensity cannot be achieved, the variation in pixel blur can be avoided by dividing the total pixel exposure time into equivalent multiple exposure periods. For example, the use of two pixel exposure pulses of equal time but half the desired total exposure time will create equal blur if the first exposure period is timed to occur at the start of the pixel period, and the second exposure period is timed to occur at the end of the pixel period.

In that regard, the pixel clock may be configured to vary the exposure time, either to adjust the level of constant exposure or to vary the exposure pixel by pixel in response to input signals. That may be done to create gray scale images or to provide special effects such as giving the effect of having an increased resolution. Additionally, the pixel by pixel exposure period may be varied within the pixel period, thereby displacing the resultant pixel exposure and providing the effect of increased resolution.

BRIEF DESCRIPTION OF THE DRAWINGS

FIG. 6a is a block diagram of VCO circuitry that provides a pixel clock pulse train and features constant exposure control;

FIG. 7a is a set of waveforms for various signals produced in the VCO circuitry of FIG. 6a;

DESCRIPTION OF THE PREFERRED EMBODIMENT

Figure 1:
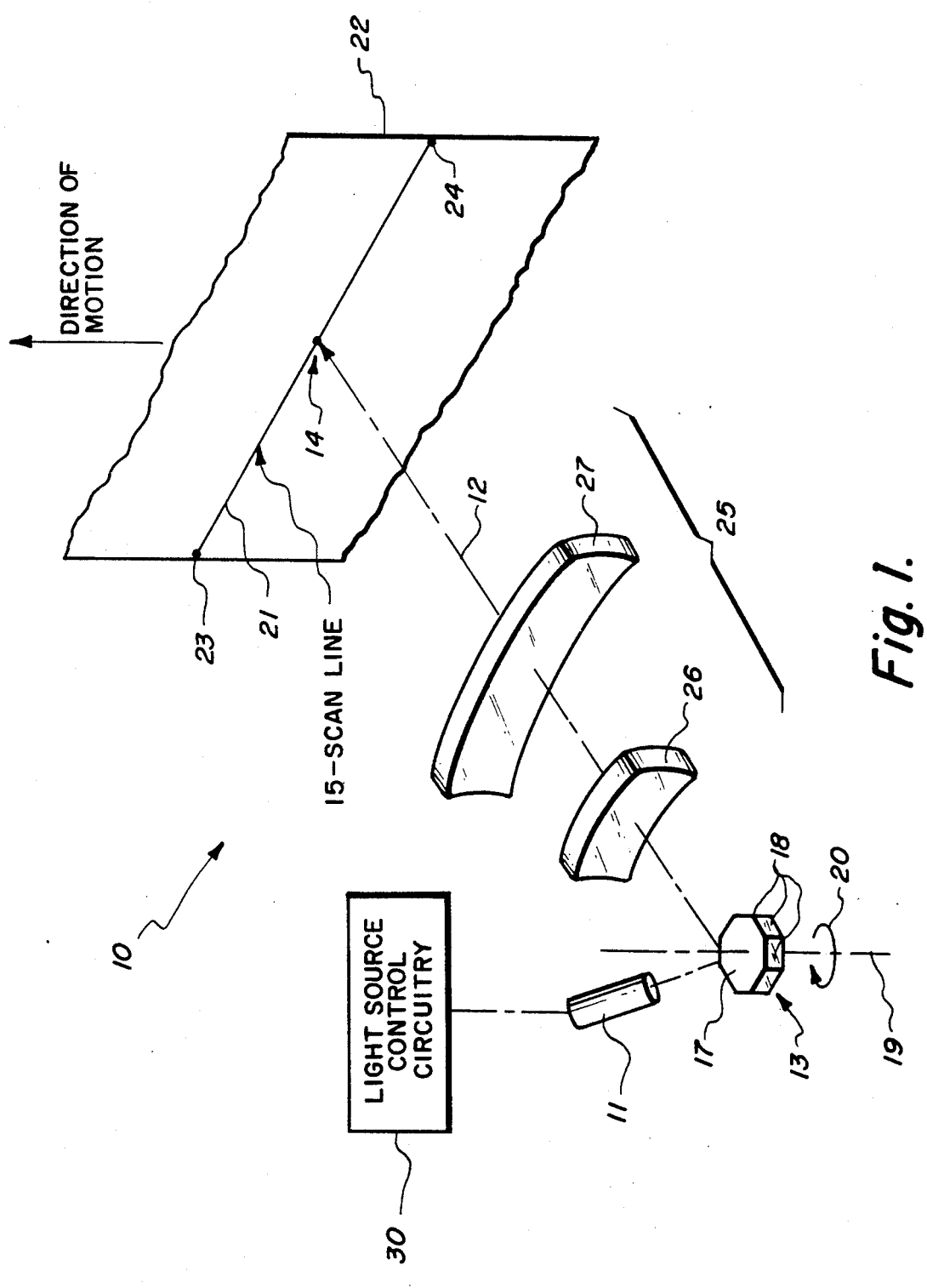
FIG. 1 of the drawings is a diagrammatic representation of a scanner constructed according to the invention.

FIG. 1 illustrates a scanner system 10 constructed according to the invention. Generally, the scanner system 10 includes a light source 11 for generating a light beam 12 and scanning means 13 for directing the light beam 12 to a spot 14 at a predetermined location relative to the scanning means 13. The scanning means 13 also serves to move the spot 14 along a scan line 15 of specified length at the predetermined location. For that purpose, the scanning means 13 in the illustrated scanner system 10 includes a rotatable element or polygon 17 with a plurality of light reflecting facets 18 (eight facets being illustrated) and other known mechanical components that are depicted in FIG. 1 by the polygon 17 rotating about a rotational axis 19 in the direction of an arrow 20.

As the polygon 17 rotates, the light beam 12 is directed by the facets 18 toward an image plane at a surface 21 to be scanned, such as the surface of a photoreceptor 22, scanning across the surface 21 in a known manner along the scan line 15 from a first end 23 of the scan line 15 past a center (the illustrated position of the spot 14) and on to a second end 24 of the scan line 15. Thus, the light beam 12 scans in a scan plane defined as a plane containing both the scan line 15 and a central light beam position that is the position occupied by the light beam 12 when it is directed toward the center of the scan line 15 (i.e., the position of the light beam 12 that is illustrated in FIG. 1).

Those components may be similar in many respects to corresponding components of existing scanner systems and the scanner system 10 may include a post-facet lens system 25 having first and second elements 26 and 27 that compensate for field curvature and wobble. Of course, the post-facet lens system 25 may be omitted without departing from the inventive concepts disclosed. In addition, the light source 11 may include a known type of infrared laser diode and known conditioning optics. It forms a beam at the facets 18 that is collimated in the scan plane and focused in the cross-scan plane. Of course, any of various light sources may be employed without departing from the inventive concepts disclosed, however.

A major way the scanner system 10 differs from existing designs is in having light source control circuitry 30 as subsequently described with reference to FIGS. 2-7c. It serves to control the light beam 12 in order to produce a plurality of pixels on the surface along the scan line 15. For that purpose, the circuitry 30 may be configured in some respects according to known techniques, including known start of scan (SOS) and end of scan (EOS) detection circuitry, for example, that is configured to produce an SOS signal each time the light beam starts a scan cycle and an EOS signal each time the light beam reaches the end of the scan line for each scan cycle. But according to a major aspect, the circuitry 30 is configured to include a linearized pixel clock, such as the pixel clock 31 illustrated in block diagram form in FIG. 2, that compensates for scanner non-linearity in order to reduce pixel position distortion and, preferably, to reduce pixel exposure distortion as well. In other words, clock pulse timing is maintained according to spot position along the scan line in a manner that compensates for scanner non-linearity in the sense that it at least partially compensates for such pixel position distortion. In other words, "compensating for the pixel position distortion resulting from scanner non-linearity" includes at least partially compensating for such non-linearity.

Figure 2:
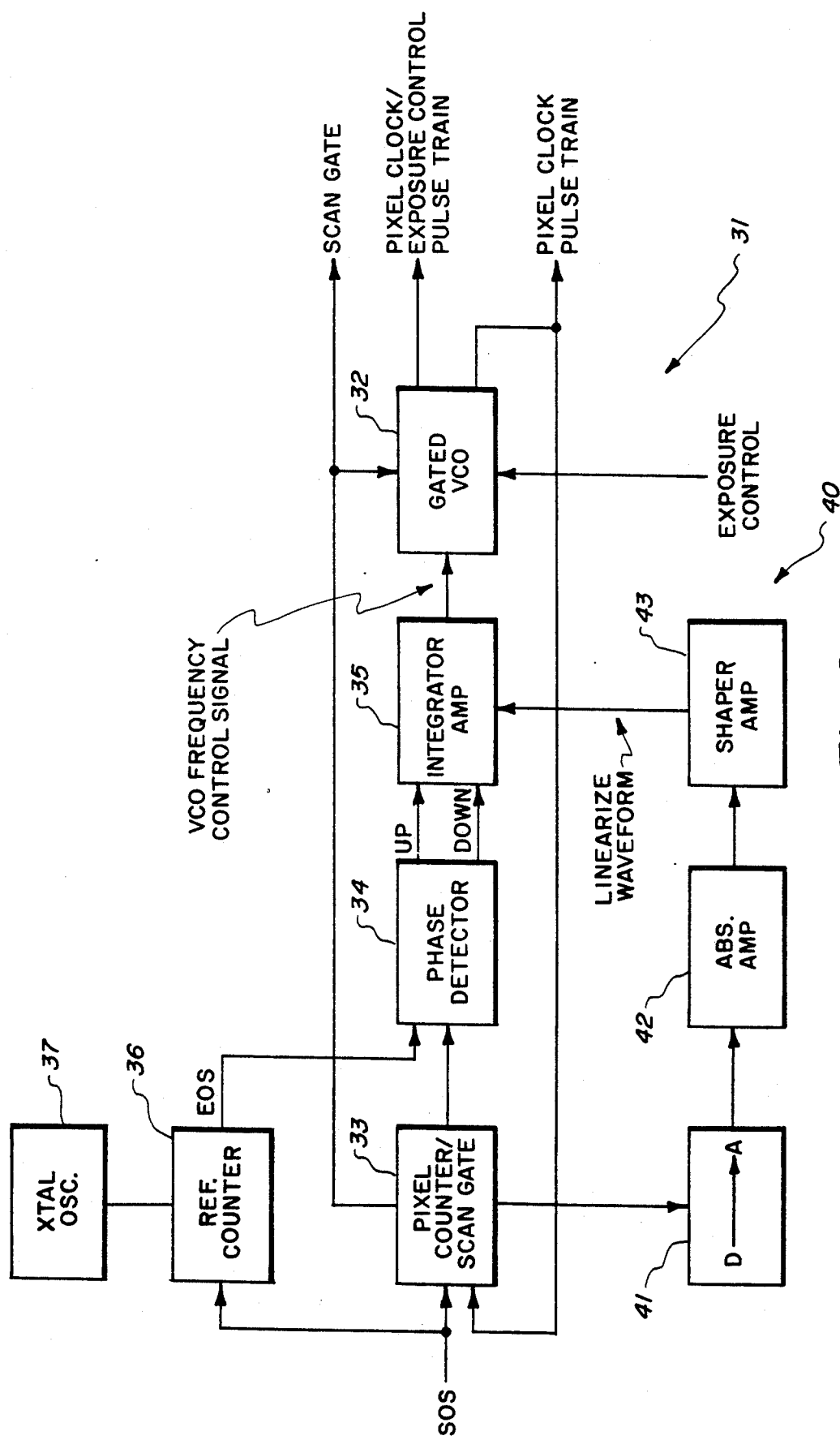
FIG. 2 is a block diagram of the pixel clock circuitry.

The pixel clock 31 serves as means for producing a train of clock pulses during each of the scan cycles as a timing signal for use in turning the light beam on and off at a predetermined number of pixel positions along the scan line 15. It includes a VCO circuit 32 that serves as means for producing the train of clock pulses and a control circuit that serves as means for varying the timing of the clock pulses. For that purpose, the control circuit of the illustrated pixel clock 31 takes the form of a phase locked loop that includes a pixel counter circuit 33, a phase detector circuit 34, and an integrator-amplifier circuit 35 (FIG. 2). The phase locked loop is locked to an end of scan (EOS) signal produced by a reference counter circuit 36 that counts a predetermined number of pulses produced by a reference crystal oscillator 37 from the start of each of the scan cycles as indicated by a start of scan (SOS) signal from the control circuitry 30 shown in FIG. 1. That arrangement results in the VCO circuit 32 producing a predetermined number of N clock pulses during each of the scan cycles, N being an integer representing the number of pixel positions along the scan line 15 shown in FIG. 1. Preferably, the frequency of the crystal oscillator 37 is about ten times the frequency of the VCO circuit 32 (i.e., it produces 10 N pulses during each of the scan cycles). That helps minimize the start of scan synchronizing errors of the reference counter 36 and the pixel counter 33. There will be random phase errors that occur at the end of each scan cycle because of such a starting phase error, but because the loop need not have a fast response, those errors have minimal significance. A start up phase detector circuit can be used to compensate for end of scan errors, but such a circuit may be overly complex for the function it performs.

With further regard to the phase locked loop, the technique of phase locking the VCO to the scanning frequency via start of scan and end of scan detection is sometimes used to compensate for fluctuations of the polygon motor velocity, or to provide automatic tracking of the polygon speed when multiple scan speeds are used. Use of such a phase locked loop is within the scope of the present invention. With a single stable polygon motor speed, it is possible to use a crystal controlled fixed frequency oscillator as a stable reference and to generate an EOS signal from it as illustrated. Other embodiments may include using the same oscillator that is used for the reference for polygon speed control in which case multiple scanning speeds would also be accommodated.

A VCO phase locked to a reference oscillator using two counters is a common method of frequency synthesis. The frequency can be adjusted by varying the maximum count of one of the two counters. Providing such an adjustment in the pixel counter circuit 33, provides a relatively simple method of adjusting the pixel frequency to compensate for such effects as those known as scan magnification errors.

The pixel clock 31 differs from typical frequency synthesizers in that the VCO and the counters 33 and 36 are gated off by suitable circuitry within the VCO circuit 3 during the interval from the end of one scan cycle to the start of the next scan cycle. It also differs in that the control circuit of the pixel clock 31 includes a waveshaping circuit 40 (FIG. 2). It causes the control signal to have a waveform such that the timing of the clock pulses varies according to the position of the spot 14 along the scan line 15 in order to compensate for scanner non-linearity in a manner reducing pixel position distortion.

There are many possible ways to generate special waveforms using analog, digital, or hybrid techniques. Since the desired waveform is used for compensating a relatively small effect, there may not be a high degree of accuracy needed in the waveshape and an analog method using RC circuits could conceivably be used. However, the use of time dependent circuitry limits the flexibility of such a system. On the other hand, digital generation of the waveform may be relatively complex. So, the hybrid system illustrated in FIG. 2, uses a linear digital to analog converter circuit 41, converting only the most significant bits of counter 33 to achieve the desired resolution, together with the absolute value circuit 42 and the multiple-slope amplifier circuit 43, one possible variation being the use of a special digital to analog conversion that performs the function of the absolute value circuit 42.

Figure 3:
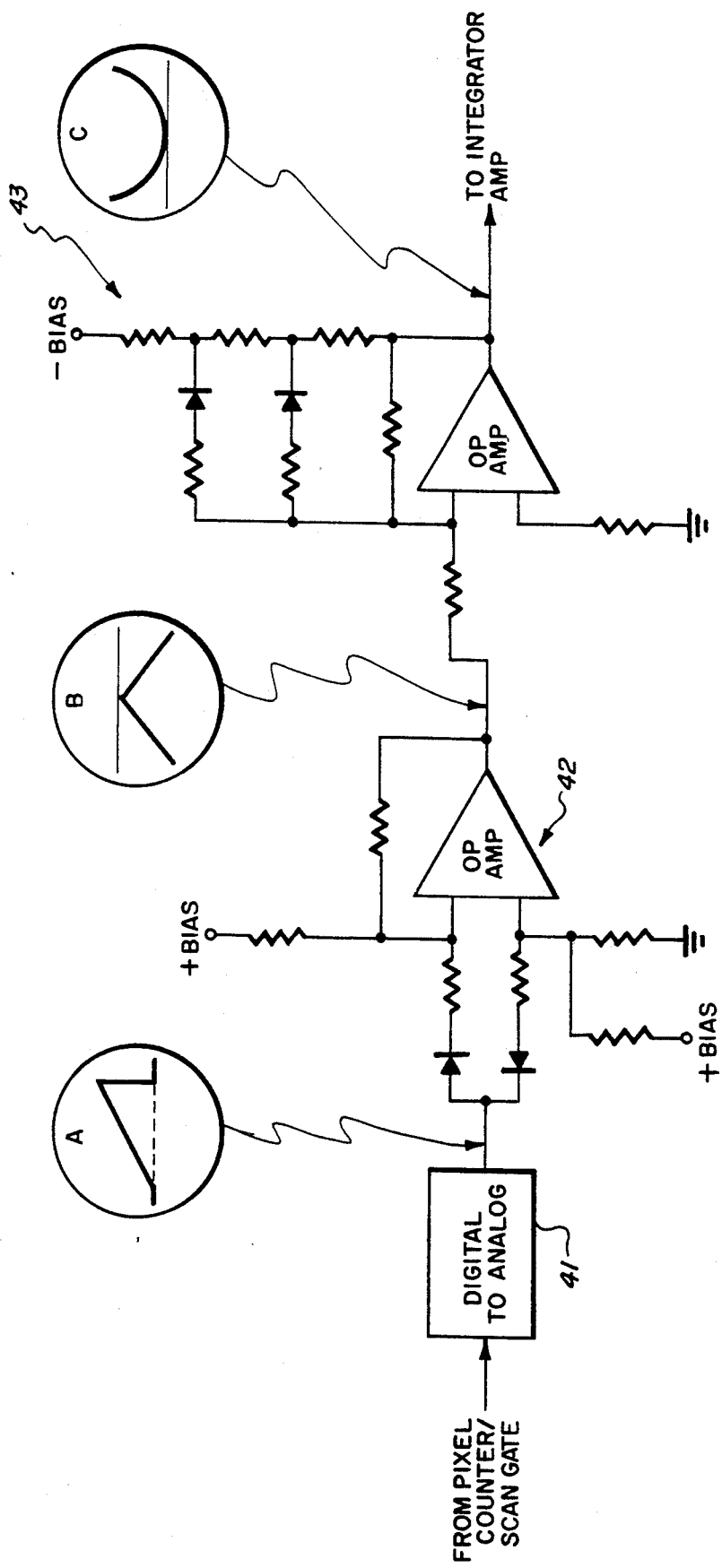
FIG. 3 is a schematic circuit diagram of the waveshaping circuit.

Considering now FIG. 3, the inset A shows the analog signal produced by the digital to analog converter 41 as the digital number in the pixel counter increases during the scan, the instantaneous voltage being proportional to the distance of the scanning spot from the start of scan position. Thus, the signal in the inset A increases as shown to provide a scan position signal. The scan position signal thus produced is coupled to the absolute value circuit 42 which employs known circuitry, such as the illustrated operational amplifier configuration, to produce a signal as shown in inset B. The absolute amplifier circuit 42 performs the function of converting the scan position signal from the digital to analog converter 41 into a scan COS distance signal that has an instantaneous value that is proportional to the instantaneous distance of the scanning spot from the center of scan. The positive bias voltage supplied to the circuit determines the inflection point of the waveform, which should occur in the center of each scan cycle (i.e., when the spot 14 is at the center of the scan line 15). Adjustment of the bias voltage provides a means to shift the inflection point to match the center of scan, if that is needed.

The scan COS distance signal is coupled to the multiple-slope amplifier circuit 43 which employs suitable known circuitry, such as the illustrated operational amplifier configuration, to produce a frequency control signal having a linearized waveform as shown in inset C. In other words, it shapes the control signal waveform to a straight line approximation of a curve representing the control signal waveform that would result in a desired variation in the timing of the clock pulses. Three different gains are provided. They are dependent on the output signal amplitude, the gain increasing with the higher positive output. Of course various other shaping circuitry may be employed within the broader inventive concepts disclosed. The waveform so generated is summed with the phase locked loop signal developed within the integrator amplifier circuit 35. It is only the shape and amplitude of the waveform that is important, not its d-c level, as because the phase locked loop will provide the long term stability to the average pixel frequency.

Figure 4:
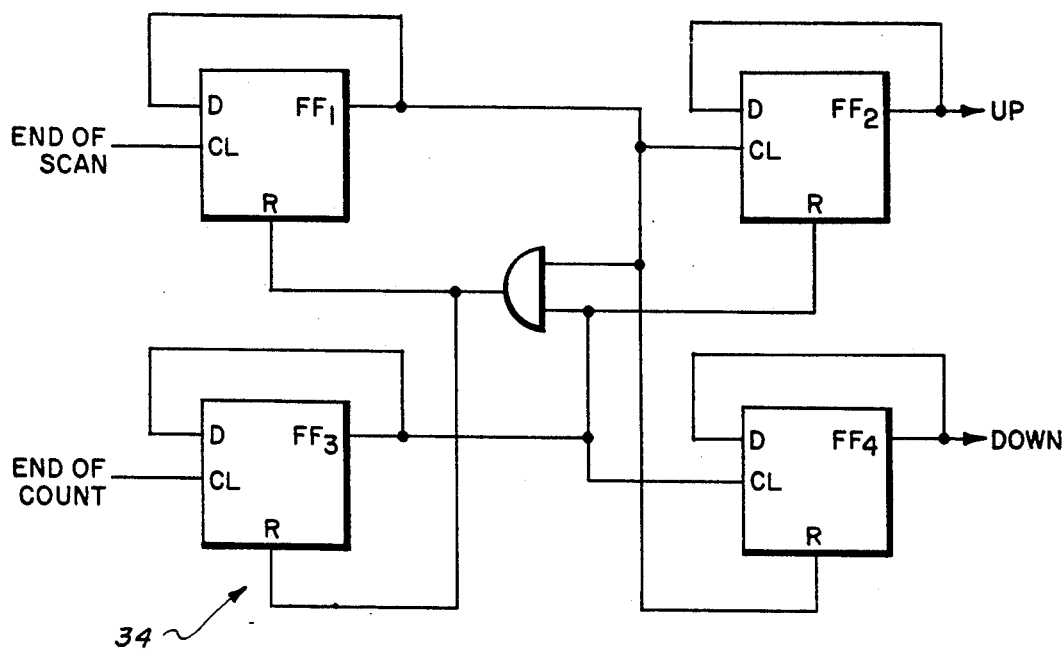
FIG. 4 is a schematic circuit diagram of the phase detector circuitry.

FIG. 4 illustrates the phase detector circuit 34, showing a typical phase detector configuration employing four flip flops $FF_1$-$FF_4$. The first two flip flops $FF_1$ and $FF_2$ stretch the first arriving END OF SCAN pulse for application to the second pair of flip flops $FF_3$ and $FF_4$ to ensure that the pulse is still present at the arrival of the END OF COUNT pulse on the other input. The first arriving leading edge of the END OF SCAN input then sets its respective flip flops, holding the other second flip flop in reset until the arrival of the END OF COUNT pulse on the other input. With the arrival of the other pulse, all flip flops are reset. Thus, one output is generated for each pair of END OF SCAN and END OF COUNT input pulses, and it appears on one output or the other depending on the first pulse to arrive. It has a pulse width that is equal to the time interval between leading edges of the pair of END OF SCAN and END OF COUNT input pulses.

Figure 5:
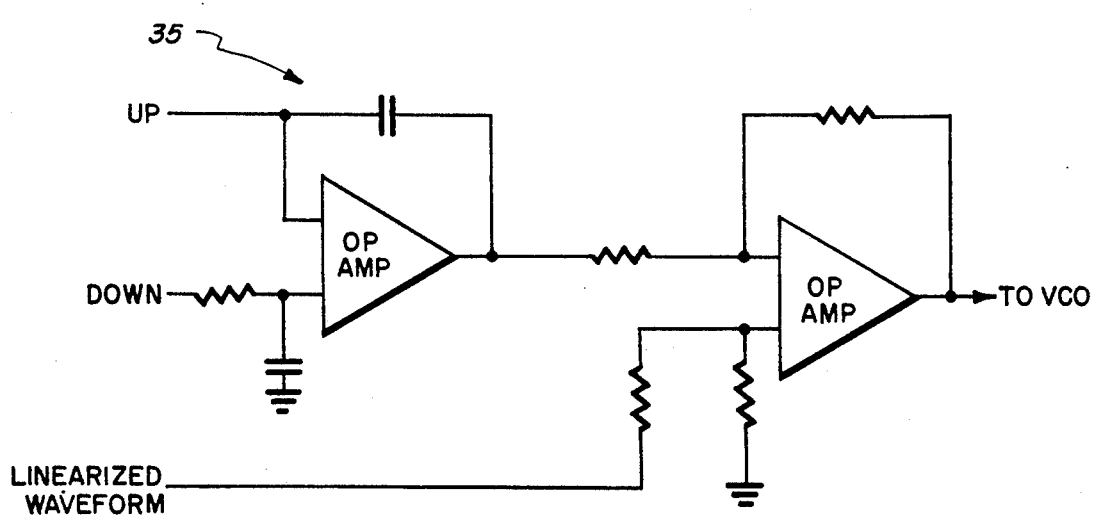
FIG. 5 is a schematic circuit diagram of the integrator and amplifier circuitry.

Of course, any of other various known phase detector configurations can be used within the broader inventive concepts. It is important, however, that there be no condition in which no pulse is generated, for example, when two leading edges arrive in near synchronism. That would cause a backlash type of effect (i.e., a frequency dead band where the frequency could drift without control). That can cause jitter effects on the output copy produced with the scanner system, having an amplitude equal to the phase detector dead band. FIG. 5 illustrates the integrator-amplifier circuit 35 in further detail. It employs known types of operational amplifier configurations to accomplish the desired functions.

No component values are given, the illustrated circuits serving only as functional descriptions. The optimum shape for the waveform of the control signal produced by the waveshaping circuit 40 is dependent on scanner non-linearity and the voltage to frequency transfer function of the VCO circuit 32. If spot position is the tangent of a linear function, spot velocity and pixel frequency (being the derivative of spot position) will be a secant squared function. Data is given in Table A for a nine inch scan line and a scan radius of 17.0 inches. A segmented linear curve with breakpoints at 1.5 and 3.0 inches from the scan center has been found to match the ideal curve quite well.

TABLE A

| Pixel Frequency Correction Waveform | | | | |
|---|---|---|---|---|
| Spot Position | Degrees | Tangent | Secant$^2$ | Segmented Linear |
| 0.0 | 0.0000 | 0.0000 | 0.0000 | −0.0010 |
| 0.5 | 1.6815 | 0.0294 | 1.0009 | 0.0013 |
| 1.0 | 3.3602 | 0.0587 | 1.0034 | 0.0036 |
| 1.5 | 5.0331 | 0.0881 | 1.0078 | 0.0059 |
| 2.0 | 6.6974 | 0.1174 | 1.0138 | 0.0139 |
| 2.5 | 8.3505 | 0.1468 | 1.0215 | 0.0219 |
| 3.0 | 9.9897 | 0.1761 | 1.0310 | 0.0299 |
| 3.5 | 11.6125 | 0.2055 | 1.0422 | 0.0429 |
| 4.0 | 13.2167 | 0.2349 | 1.0552 | 0.0559 |
| 4.5 | 14.8000 | 0.2642 | 1.0698 | 0.0689 |

Figure 6B:
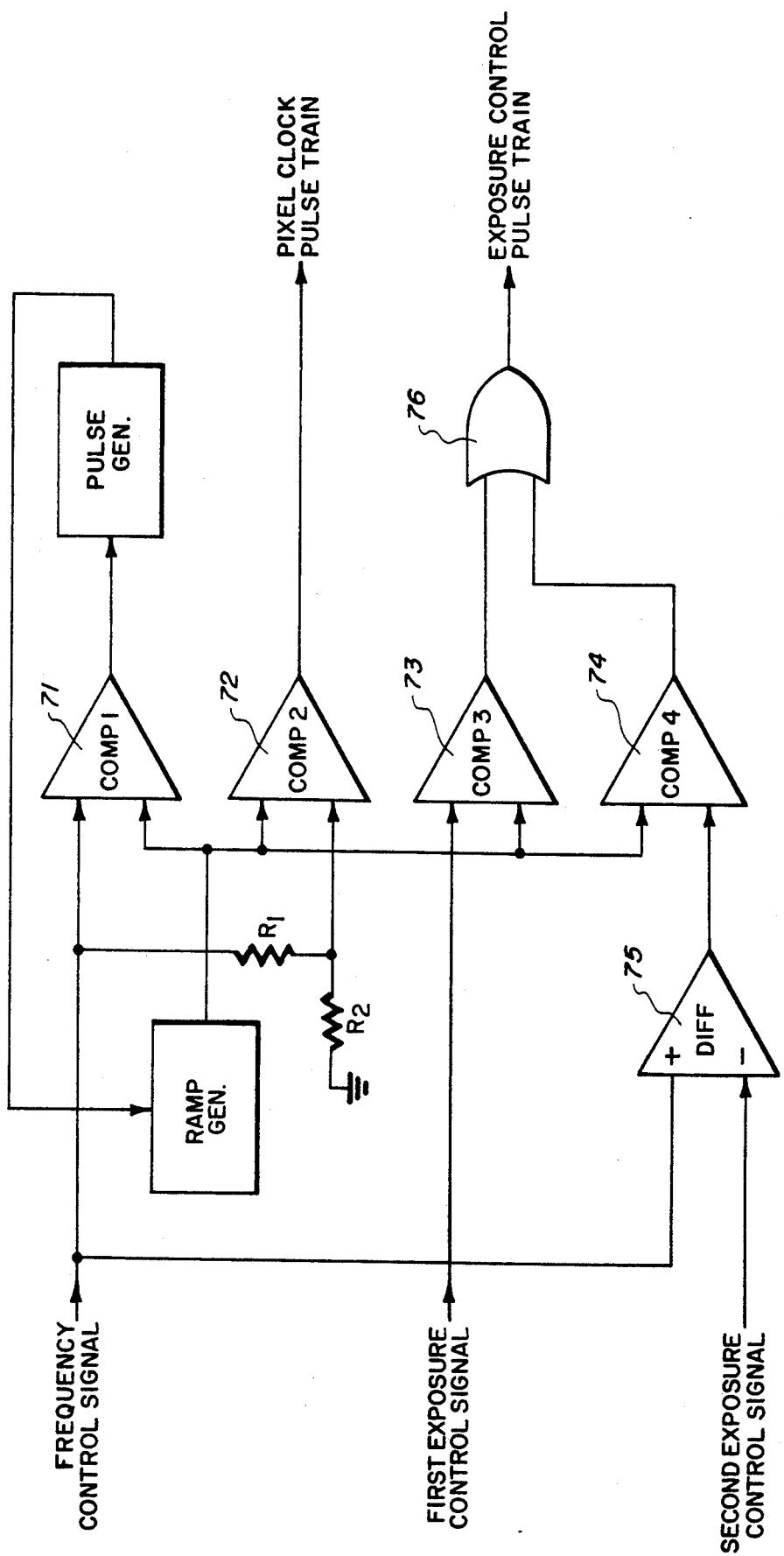
FIG. 6b is a block diagram of VCO circuitry that provides a pixel clock pulse train and an exposure control pulse train that can be used for special exposure control effects.

Considering now FIGS. 6a, 6b, 7a, and 7b, they relate to the VCO and the generation of pixel clock and exposure control signals for reduction of pixel placement and pixel exposure distortion. FIG. 6a illustrates an embodiment of the VCO that generates a pixel clock pulse train that is variable in pulse repetition rate (frequency) in response to a Frequency Control Signal, and is variable in pulse width in response to an Exposure Control Signal. The major frequency timing element of the VCO is a linear ramp generator 61 of known configuration, such as a constant current source charging a capacitor, or a "Bootstrap" circuit.

The ramp generator 61 is resetable to zero on receipt of a signal from the output of a pulse generator 62, and generates a ramp signal at the termination of the pulse. The ramp signal is applied to two comparators 63 and 64, the first comparator 63 being used to control the period of the timing cycle, and the second comparator 64 being used to generate a constant but adjustable pulse width. Referring to FIG. 7a, the output of the ramp generator 61 appears as a sawtooth waveform A. When this increasing voltage reaches the amplitude of the frequency control signal C at point D, the output of the comparator 63 triggers the pulse generator 62 which generates the pulse whose leading edge is at point E. This pulse resets the ramp generator 61 to zero, and at the termination of the pulse a new ramp signal is generated. As shown in FIG. 7a, the period P of the sawtooth is dependent on the frequency control signal C.

The sawtooth waveform generated by the ramp generator 61, comparator 63, and pulse generator 62 is also applied to the negative input of the comparator 64. While the ramp voltage A is of a lower amplitude than the exposure control signal B that is applied to the positive input to the comparator 64, the output of the comparator 62 is high. When the ramp voltage exceeds the exposure control signal B at point F, the output of the comparator 64 is low. Thus, while the period of the pixel clock pulse train is variable in accordance to the frequency control signal C (as at $P_1$ and at $P_n$ in FIG. 7a) the width of the pulses are constant with a constant exposure control signal as at $W_1$ and $W_n$.

Figure 7B:
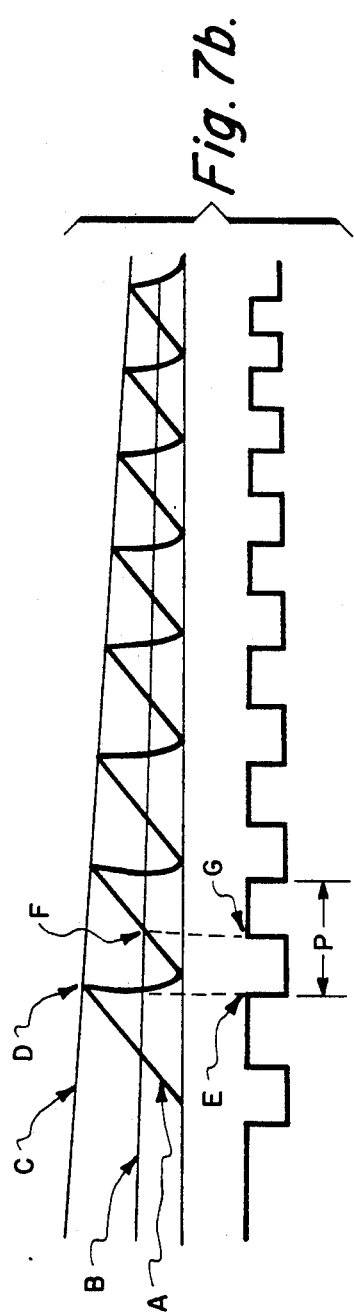
FIG. 7b is a set of waveforms related to the symmetrical square wave pixel clock in the VCO circuitry of FIG. 6b.

In some applications, it is desirable that separate pixel clock and exposure control pulse trains be generated, and that the pixel clock pulse train have a symmetrical geometry. FIGS. 6b and 7b illustrate one embodiment of the invention that provides such a symmetrical pixel clock. The circuit of FIG. 6b operates in a manner similar to that of the circuit shown in FIG. 6a, with the difference that both the comparator 71 and the comparator 72 receive the frequency control signal, but comparator 72 at a reduced amplitude such that the pixel clock so generated is approximately symmetrical, the symmetry of the pixel clock being dependent on the ratio of $R_1$ and $R_2$. Referring to FIG. 7b, the signal B is proportional to the signal C, dependent on the ratio of $R_1$ and $R_2$, and typically would be set such that the crossover point of the ramp A with the control signal B at point F in FIG. 7b is at the mid point of the pixel period.

Figure 7C:
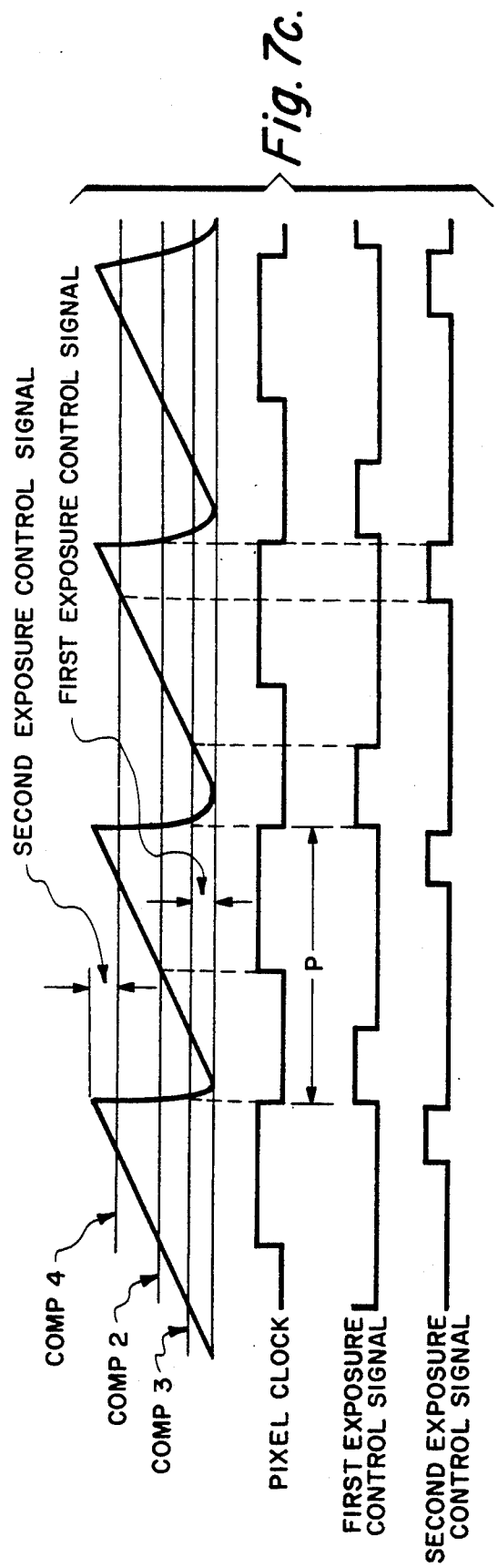
FIG. 7c is a set of waveforms related to the symmetrical square wave, first exposure control signal, and second exposure control signal in the VCO circuitry of FIG. 6b.

Also, in some applications it is desired to utilize two pixel exposure periods per pixel position, one occurring at the beginning of the pixel period, the other occurring at the end of the pixel period. Referring to FIGS. 6b and 7c, two additional comparators 73 and 74 in the VCO provide separate control of two such pixel exposure periods by comparing the ramp to two separate exposure control signals. The first exposure control signal is applied to the comparator 73 in a manner similar to that described for the embodiment in FIG. 6a, and generates a pulse train with a controllable pulse width, with the pulses occurring during the first portion of the pixel period. A second exposure control signal is also applied to the comparator 74 via a difference amplifier 75. The second exposure control signal may be one and the same as the first exposure control signal, or may be a separate and independent input. The second exposure control signal is inverted by the difference amplifier as it is subtracted from the frequency control signal. The input waveform, the signal inputs, and the pulse train outputs of the comparators 72, 73, and 74 are shown in FIG. 7c. The outputs of the comparators 73 and 74 are combined by an OR gate 76 to provide an exposure control pulse train.

The circuit of FIG. 6b can be utilized as a means to insure that pixel blur is consistent for both long and short exposure times, independent of spot velocity, by dividing the total pixel exposure time into equal periods, one occurring at the start of the pixel period and another occurring at the end of the pixel period. The circuit of FIG. 6b can also be used to provide the effect of increased resolution by providing the capability of controlling the pixel exposure pixel by pixel, and by providing the means whereby the pixel exposure occurs selectably at the start of the pixel period, or at the end of the pixel period. It is apparent to one of reasonable skill in the art of digital logic that combining the output of the comparator 73 and the comparator 74 in an inverting exclusive OR gate 76 provides the capability of controlling the width of a single exposure pulse and placing that exposure pulse in desired relationship to the pixel interval, i.e. the output of the inverting exclusive OR gate is high during the overlap period of a high output from the comparators 73 and 74.

From the foregoing, one of reasonable skill can expand upon the inventive concepts disclosed to configure the pixel clock circuit for controlling single, higher intensity light beam pulses of shorter duration, one for each pixel position, in order to minimize the effects of blur resulting from variations in spot velocity along the scan line. In addition, the pixel clock circuit can be configured to produce a clock signal for turning the light beam on for multiple exposure periods for each pixel, (e.g., one pulse near the start of each pixel position and one near the end).

Thus, the invention provides a scanner with a pixel clock that has a VCO for producing a train of clock pulses and waveshaping circuitry for producing a linearized VCO control signal. The waveform of the control signal is such that the frequency of the VCO varies in a way compensating for scanner non-linearity in order to reduce pixel position distortion. That results in less logic circuitry and less frequency dependent componentry.

In addition, the pixel clock may be configured to produce constant exposure timing for each pixel position in order to turn a constant intensity light beam on for the same time interval for each pixel position, and thereby produce uniform exposure from pixel to pixel. Further, the pixel clock may be configured to allow for adjustment of the level of constant exposure, or to vary it pixel by pixel for creating gray scale images, or displace pixel exposure relative to the pixel period to give the effect of having an increased resolution. Moreover, in order to reduce pixel blur and to realize the maximum resolution from the optical system, the pixel clock may be configured to produce a short exposure time at high intensity in order to achieve the same exposure but with very little exposure blur, or, where high intensity cannot be achieved, to produce multiple exposure periods for each pixel.

Although an exemplary embodiment of the invention has been shown and described, many changes, modifications, and substitutions may be made by one having ordinary skill in the art without necessarily departing from the spirit and scope of the invention.

What is claimed is:

1. A scanner system, comprising:
   means defining a light source for producing a light beam;
   scanning means for directing the light beam to a spot on a surface to be scanned and for moving the spot across the surface along a scan line of predetermined length in a series of scan cycles, the scanning means generating a start of scan signal at the start of each scan cycle;
   means defining a pixel clock for producing a sequence of pixel clock pulses during each of the scan cycles useful in turning the light beam on and off at a predetermined number of pixel positions on the scan line, and having means defining a phase locked loop for causing the pixel clock to produce N clock pulses during each of the scan cycles, wherein N is an integer designating the predetermined number of pixel positions along the scan line;

pixel clock timing control means responsive to the start of scan signal for generating a sequence of digital timing control signals representative of an instantaneous spot scan position of the light spot of the scan line relative to a start of scan position as represented by the start of scan signal;

digital to analog converter means, responsive to the sequence of digital timing control signals, for generating a sequence of analog spot location signals corresponding to the instantaneous spot scan position of the light spot on the scan line relative to the start of scan position;

absolute amplifier means for converting the sequence of analog spot location signals to a sequence of analog distance signals corresponding tot he distance of the light spot relative to a center of scan position; and, non-linear amplifier means responsive to the sequence of analog distance signals for generating a pixel clock control signal having a waveform shaped to a straight-line approximation of a desired timing variation curve for controlling the timing of each of the pixel clock pulsed generated by the pixel clock means during each scan cycle.

2. A scanner system as recited in claim 1, wherein the pixel clock pulses are of substantially constant width over the scan cycle.

3. A scanner system as recited in claim 2, wherein the pixel clock includes means defining a constant-width pulse train circuit for producing a train of constant width pulses such that the leading edge of each of the constant width pulses is substantially synchronized with a respective one of the clock pulses.

4. A scanner system as recited in cl aim 3, wherein the constant-width pulse train circuit includes means for producing a signal having a first and a second state, the signal being characterized by changing from the first state to the second state upon the detection by the constant-width pulse train circuit of a signal representing the leading edge of a clock pulse, and then automatically reverting from the second state to the first state a constant time interval thereafter.

5. A scanner system as recited in claim 1, further including pixel clock duration control means for selectively varying the width of the pixel clock pulses over the scan cycle.

6. A scanner system as recited in claim 1, wherein the pixel clock circuit is configured to provide a single narrow pulse for each pixel position in order to control a single, higher intensity light beam pulse of shorter duration for each pixel position.

7. A scanner system as recited in claim 1, wherein the pixel clock circuit is configured to provide multiple pulses per pixel position in order to turn the light beam on for a plurality of exposure periods for each pixel position.

8. A scanner system as recited in claim 1, wherein the pixel clock circuit is configured to produce at least one exposure pulse during each of a plurality of pixel periods and place that exposure pulse in desired relationship to the pixel period.

9. A scanner system as recited in claim 8, wherein the pixel clock circuit is configured to vary the width of at least one of the exposure pulses in order to vary the exposure.

10. In a scanner system having means defining a light source for producing a light beam, and scanning means for directing the light beam to a spot on a surface to be scanned and for moving the spot across the surface along a scan line of predetermined length in a series of scan cycles, the scanning means generating a start of scan signal at the start of each scan cycle, a method of compensating for scanner nonlinearity along the scan line to reduce pixel position distortion, the method comprising the steps of:

producing a sequence of pixel clock pulses during each of the scan cycles useful in turning the light beam on and off at a predetermined number of pixel positions on the scan line;

generating a sequence of digital timing control signals representative of an instantaneous spot scan position of the light spot on the scan line relative to a start of scan position as represented by the start of scan signal, the sequence of digital timing control signals being generated to approximate a desired timing variation curve representing desired variations in the timing of the pixel clock pulses during the scan cycle;

generating a sequence of analog spot location signals corresponding to the instantaneous spot scan position of the light spot on the scan line relative to the start of scan position;

converting the sequence of analog spot location signals to a sequence of analog distance signals corresponding to the distance of the light spot relative to a center of scan position; and, generating a pixel clock control signal having a waveform shaped to a straight-line approximation of the desired timing variation curve for controlling the timing of each of the pixel clock pulses generated by the pixel clock means during each scan cycle.

11. A method as recited in claim 10, further including the step of maintaining the duration of the pixel clock pulses substantially constant over the scan cycle.

12. A scanner system as recited in claim 10, further including the step of selectively varying the duration of the pixel clock pulses over the scan cycle.

13. A method as recited in claim 12, further comprising the step of producing at least one exposure pulse during each of a plurality of pixel periods and placing that exposure pulse in desired relationship to the pixel period.

14. A method as recited in claim 13, further comprising the step of varying the width of at least one of the exposure pulses in order to vary the exposure.

15. A method as recited in claim 10, wherein the step of shaping the waveform includes producing a scan position signal, shaping the scan position signal into a Center of Scan distance signal, and shaping the Center of Scan distance signal into a straight line approximation of the timing curve.

16. A method as recited in claim 10, further comprising the step of producing a constant width train of pulses in order to compensate for scanner non-linearity in a manner reducing pixel exposure distortion.

17. A method as recited in claim 16, wherein the step of producing a constant width train of pulses includes producing multiple pulses per pixel position in order to enable multiple exposures per pixel position.

* * * * *